3,520,951
FLAME RETARDANT POLYESTERS
David E. Kramm, Laurel, and Thomas R. Steadman,
Kensington, Md., assignors to W. R. Grace & Co., New
York, N.Y., a corporation of Connecticut
No Drawing. Filed Aug. 25, 1967, Ser. No. 663,246
Int. Cl. C08f 21/02; C08g 17/12
U.S. Cl. 260—869                                  5 Claims

ABSTRACT OF THE DISCLOSURE

A flame retardant polyester resin containing at least about 10% by weight of chlorine, the chlorine being chemically bonded to the polymer chain in the form of the pentachlorophenoxy acetate radical.

---

The present invention relates to a novel and useful polyester resin. More particularly it relates to a polyester resin containing chlorine chemically bonded to the polymer chain so as to render the polyester flame retardant.

Polyester resins are well known in the art and have been widely accepted for a number of products for years (see U.S. Pats. 2,518,503, 3,016,381, 3,041,294 and 3,283,032). The polyester resins have been used for the construction of building panels, automobile parts, boat hulls, automobile bodies and many other uses. One drawback to the polyester resins is the fact that they have a high carbon content and are quite readily flammable. Many attempts have been made to render the polyester resin flame retardant by the addition of inexpensive inorganic and organic materials. However, many of the materials "bleed" from the resin and are unsuitable for general use. Other materials render the resin brittle or in other ways affect the physical characteristics so that the resin has limited use. Quite obviously, if a flame retardant polyester could be provided with good physical properties, it would receive widespread acceptance in the art.

It is an object of the present invention to provide a polyester resin which is flame retardant. Another object is to provide a polyester resin which is flame retardant and self-extinguishing when tested according to ASTM–D–635–63. A further object is to provide a polyester resin which can be modified in an inexpensive manner so as to provide flame retardancy at a low cost. A still further object is to provide a polyester resin having a quite high chlorine content in which the chlorine is chemically bonded to the polymer chain. Other objects will become apparent as the description of the invention proceeds.

These objects are accomplished by the present invention which provides a polyester resin containing at least about 10% by weight of chlorine, said chlorine being chemically bonded to the polymer chain in the form of the radical.

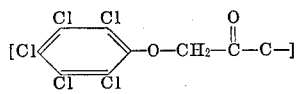

In a preferred embodiment of the present invention, the chlorine content of the polyester resin is from about 10 to about 46% by weight, more preferably, from about 18 to about 40% by weight, based on the total weight of the resin. In a still more preferred embodiment, the polyester resin contains chlorine in amounts of from about 21 to about 38% by weight and is self-extinguishing.

In another embodiment of the present invention, an unsaturated polyester resin containing chlorine in amounts from about 18 to about 40% by weight is crosslinked with styrene so as to form a final flame retardant crosslinked polyester resin.

The term "polyester" is used to signify a resin in the solid or liquid form which contains a plurality of the conventional ester groups

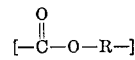

wherein R is an organic radical. The polyester resin may be saturated or unsaturated and may be aliphatic, aromatic or heterocyclic in nature. The polyester may be derived from the reaction product of a dicarboxyl acid, such as adipic acid, and a dihydric alcohol such as diethylene glycol which may be modified with a polyhydroxy compound such as trimethylolpropane, glycerol, pentaerythritol or the like. While the carboxyl acid itself is generally utilized in the preparation of the polyester resin, the acid anhydride or acid halides may also be used.

Generally, polyester resins are formed with stoichiometrically equivalent amounts of acid and hydroxyl compounds. However, in the present invention an excess of one or the other of the reactants may be employed although the physical properties of the resin may change somewhat. In any event the addition of the pentachlorophenoxy acetate radical, renders the resin more flame retardant than the unmodified resin. The addition of the compound to the reaction mixture chemically bonds the acid to the polymer chain by the formation of an ester group thereby giving it permanent flame retardancy.

A particularly preferred class of polyester resins to be employed in the present invention, is the class wherein an unsaturated acid such as maleic acid is reacted with a mixture of a dihydroxy compound and a polyhydroxy compound containing at least three hydroxyl groups. In such resins, the pentachlorophenoxy acetic acid is utilized to esterify at least a portion of the surplus hydroxyl group. The residual unsaturated bonds of the polyester may then be reacted with an unsaturated monomer such as styrene to cure (crosslink) the resin utilizing an organic peroxide such as methyl ethyl ketone peroxide, benzoyl peroxide or the like.

The following examples are given to illustrate the invention and are not intended to limit it in any manner. All parts are given in parts by weight unless otherwise expressed.

EXAMPLES 1 AND 2

Base resin

A 1" diameter 8" long test tube is suspended in an oil bath heated to a temperature of 160° C. The test tube is capped with a cork containing two tubes—an entry tube which extends to the bottom of the test tube and an exit tube which extends through the cork. Nitrogen is continuously flushed through the tubes at a rate of about 20 cc./min. The nitrogen stirs the reactants and at the same time excludes oxygen from the reaction site. The listed reactants are added to the tube in the indicated quantities, the tube is sealed with the cork, the nitrogen is turned on and the reaction proceeds.

| Condensation monomer | Molecular weight | Moles | Grams | Milli-equivalents |
|---|---|---|---|---|
| Pentachlorophenoxy acetic acid | 324.35 | 0.12 | 38.9 | 120 |
| Maleic anhydride | 98.06 | 0.065 | 6.39 | 130 |
| Glycerol | 92.09 | 0.035 | 3.23 | 105 |
| 1,2 propylene glycol | 76.09 | 0.073 | 5.55 | 145 |

After a reaction time of 3¼ hours the acid number has dropped to 27.8 milligrams of KOH per gram of resin. The heat is turned off and 30.2 milligrams of hydroquinone is added as a polymerization inhibitor. The resin is then cooled to room temperature. The chlorine content of the resin is 42% based on the total weight of the resin. The weight of the hydroquinone added is insignificant since it represents only a small fraction of a percent. The resulting base resin is hard, brittle, slightly opaque and is flame retardant according to ASTM–D–635–63.

Cured resin

The base resin is then mixed at 90° C. under nitrogen with 29.4% by weight of styrene and allowed to cool to room temperature. The viscous resin solution which results is stable at room temperature. The resin is then mixed at room temperature with 0.5% by weight of benzoyl peroxide and 0.5% by weight of methyl ethyl ketone peroxide. The samples are cured (crosslinked) at 110° C. for a period of about 17 hours in glass tubes to form rods 6 millimeters in diameter and 6″ in length. A hard, yellowish, brittle resin results. The resin has a chlorine content of 29.4% based on the total weight of the resin. When the resin is subjected to ASTM–D–635–63, the test shows it to be flame retardant.

The above examples show that the pentachlorophenoxy acetic acid can be used to make cured or uncured polyester resins flame retardant.

EXAMPLES 3 AND 4

The equipment used to form the base resin above is employed to form another base resin in the same manner. The mixed reactants are added to the tube in the indicated quantities, the tube is sealed with the cork, the nitrogen turned on and the reaction proceeds at 160° C. to 200° C.

| Condensation monomer | Molecular weight | Moles | Grams | Milli-equivalents |
|---|---|---|---|---|
| Pentachlorophenoxy acetic acid | 324.35 | 0.120 | 38.9 | 120 |
| Maleic anhydride | 98.06 | 0.065 | 6.37 | 130 |
| 1,3 butane diol | 90.12 | 0.032 | 2.93 | 65 |
| Dipropylene glycol | 134.18 | 0.033 | 4.36 | 65 |
| Glycerol | 92.09 | 0.040 | 3.68 | 120 |

After a reaction time of 4 hours the acid number has dropped to 8.0 milligrams of KOH per gram of resin. The resin is then cooled to room temperature. The chlorine content of the resin is 40.2% based on the total weight of the resin. The resulting base resin is yellowish, hard and brittle and is flame retardant according to ASTM–D–635–63.

Cured resin

The base resin is then mixed at 90° C. under nitrogen with 25% by weight of the styrene and allowed to cool at room temperature. The resulting viscous resin solution is stable at room temperature. The resin is then mixed at room temperature with 0.5% by weight of benzoyl peroxide and 0.5% of methyl ethyl ketone peroxide. The samples are cured at 110° C. for a period of about 17 hours in glass tubes to form rods 6 millimeters in diameter and 6″ in length. A brownish somewhat flexible resin results. The resin has a chlorine content of 30.1% based on the total weight of the resin. When the resin is subjected to ASTM–D–635–63, the test shows it to be flame retardant.

The above examples show that the pentachlorophenoxy acetic acid can be used with a variety of polyester resins to make them flame retardant. They also show the hydroquinone is not necessary in such systems.

EXAMPLES 5 AND 6

Base resin

The equipment used to form the base resin above is employed to form another base resin in the same manner. The mixed reactants are added to the tube in the indicated quantities, the tube is sealed with the cork, the nitrogen turned on and the reaction proceeds at 180–185° C.

| Condensation monomer | Molecular weight | Moles | Grams | Milli-equivalents |
|---|---|---|---|---|
| Pentachlorophenoxy acetic acid | 324.35 | 0.120 | 38.9 | 120 |
| Maleic anhydride | 98.06 | 0.165 | 16.18 | 330 |
| 1,2 propylene glycol | 76.09 | 0.117 | 8.90 | 234 |
| Pentaerythritol | 136.15 | 0.054 | 7.35 | 216 |

After a reaction time of 5¼ hours the acid number has dropped to 38.1 milligrams of KOH per gram of resin. The heat is turned off and 8.0 milligrams of hydroquinone is added as a polymerization inhibitor. The resin is then cooled to room temperature. The chlorine content of the resin is 32.1% based on the total weight of the resin. The weight of the hydroquinone is insignificant since it only amounts to a small fraction of the resin. The resulting base resin is water white, and slightly opaque and is flame retardant according to ASTM–D–635–63.

Cured resin

The base resin is then mixed at 90° C. under nitrogen with 36% by weight of the styrene and allowed to cool at room temperature. The resulting viscous resin solution is stable at room temperature. The resin is then mixed at room temperature with 1.0% by weight of benzoyl peroxide. The samples are cured at 120° C. for a period of about 17 hours in glass tubes to form rods 6 millimeters in diameter and 6″ in length. A slightly turbid, white, hard resin results. The resin has a chlorine content of 20.6% based on the total weight of the resin. When the resin is subjected to ASTM–D–635–63, the test shows it to be flame retardant.

The above examples show that the pentachlorophenoxy acetic acid can be used with a variety of polyester resins to make them flame retardant. The examples also show that a single peroxide may be used as a curing agent.

EXAMPLES 7 AND 8

Base resin

The equipment used to form the base resin above is employed to form another base resin in the same manner. The mixed reactants are added to the tube in the indicated quantities, the tube is sealed with the cork, the nitrogen turned on and the reaction proceeds at 165–195° C.

| Condensation monomer | Molecular weight | Moles | Grams | Milli-equivalents |
|---|---|---|---|---|
| Pentachlorophenoxy acetic acid | 324.35 | 0.096 | 31.15 | 96 |
| Maleic anhydride | 98.06 | 0.120 | 11.77 | 240 |
| 1,2 propylene glycol | 76.09 | 0.072 | 5.48 | 144 |
| Pentaerythritol | 136.15 | 0.048 | 6.53 | 192 |

After a reaction time of 5 hours the acid number has dropped to 26.4 milligrams of KOH per gram of resin. The heat is turned off and the resin is cooled to room temperature. The chlorine content of the resin is 33.2% based on the total weight of the resin. The resulting base resin is hard, water white and slightly opaque and is flame retardant according to ASTM–D–635–63.

Cured resin

The base resin is then mixed at room temperature with 30% by weight of the styrene. The resulting viscous resin solution is stable at room temperature. The resin is then mixed at room temperature with 1.0% by weight of benzoyl peroxide. The samples are cured at 115° C. for a period of about 17 hours in glass tubes to form rods 6 millimeters in diameter and 6″ in length. A water white, hard, strong resin results. The resin has a chlorine content of 23.2% based on the total weight of the resin. When the resin is subjected to ASTM–D–635–63, the test shows it to be flame retardant.

The above examples show that the pentachlorophenoxy acetic acid can be used with a variety of polyester resins to make them flame retardant. The examples show that the tetra functional pentaeryrithritol may be used as the hydroxyl compound in such resins and that blending of the base resin with styrene may be done at room temperature.

EXAMPLES 9 AND 10

Base resin

The equipment used to form the base resin above is employed to form another base resin in the same manner. The mixed reactants are added to the tube in the indicated quantities, the tube is sealed with the cork, the nitrogen turned on and the reaction proceeds at 165–195° C.

| Condensation monomer | Molecular weight | Moles | Grams | Milli-equivalents |
|---|---|---|---|---|
| Pentachlorophenoxy acetic acid | 324.35 | 0.100 | 32.4 | 100 |
| Maleic anhydride | 98.06 | 0.100 | 9.81 | 200 |
| Dipropylene glycol | 134.18 | 0.020 | 2.68 | 40 |
| 1,2 propylene glycol | 76.09 | 0.050 | 3.81 | 100 |
| Pentaerythritol | 136.15 | 0.040 | 5.45 | 160 |

After a reaction time of 4⅓ hours the acid number has dropped to 27.9 milligrams of KOH per gram of resin. The heat is turned off and 5.5 milligrams of hydroquinone is added as a polymerization inhibitor. The resin is then cooled to room temperature. The chlorine content of the resin is 34.8% based on the total weight of the resin. The weight of the hydroquinone is insignificant since it only amounts to a small fraction of the resin. The resulting base resin is hard, yellowish, and brittle and is flame retardant according to ASTM–D–635–63.

Cured resin

The base resin is then mixed at 90° C. under nitrogen with 30% by weight of the styrene and allowed to cool at room temperature. The resulting viscous resin solution is stable at room temperature. The resin is then mixed at room temperature with 1.0% by weight of benzoyl peroxide. The samples are cured at 120° C. for a period of about 17 hours in glass tubes to form rods 6 millimeters in diameter and 6" in length. A milky turbid and hard resin results. The resin has a chlorine content of 24.4% based on the total weight of the resin. When the resin is subjected to ASTM–D–635–63, the test shows it to be flame retardant.

The above examples show that the pentachlorophenoxy acetic acid can be used with a variety of polyester resins including those containing a mixture of polyhydroxyl compounds to make them flame retardant.

EXAMPLES 11 AND 12

Base resin

The equipment used to form the base resin above is employed to form another base resin in the same manner. The mixed reactants are added to the tube in the indicated quantities, the tube is sealed with the cork, the nitrogen turned on and the reaction proceeds at 180° C.±5° C.

| Condensation monomer | Molecular weight | Moles | Grams | Milli-equivalents |
|---|---|---|---|---|
| Pentachlorophenoxy acetic acid | 324.35 | 0.069 | 22.380 | 69 |
| Maleic anhydride | 98.06 | 0.116 | 11.327 | 231 |
| 1,2 propylene glycol | 76.09 | 0.060 | 4.565 | 120 |
| Trimethyolethane | 120.15 | 0.060 | 7.148 | 180 |

After a reaction time of 4 hours the acid number has dropped to 46.8 milligrams of KOH per gram of resin. The heat is turned off and 12.7 milligrams of hydroquinone is added as a polymerization inhibitor. The resin is then cooled to room temperature. The chlorine content of the resin is 29.1% based on the total weight of the resin. The weight of the hydroquinone is insignificant since it only amounts to a small fraction of the resin. The resulting base resin is hard, slightly yellow and clear and is flame retardant according to ASTM–D–635–63.

Cured resin

The base resin is then mixed at 90° C. under nitrogen with 36.8% by weight of the styrene and allowed to cool at room temperature. The resulting viscous resin solution is stable at room temperature. The resin is then mixed at room temperature with 1.0% by weight of benzoyl peroxide. The samples are cured at 115° C. for a period of about 17 hours in glass tubes to form rods 6 millimeters in diameter and 6" in length. A clear, slightly yellow, hard resin results. The resin has a chlorine content of 18.4% based on the total weight of the resin. When the resin is subjected to ASTM–D–635–63, the test shows some flame resistance but it is not self-extinguishing and does not pass the test.

The above examples show that in order to have a self-extinguishing resin, the resin should contain over 18.4% by weight of chlorine in the pentachlorophenoxy acetic acid structure of the resin. A lesser amount, however, does reduce the flammability of the resin.

EXAMPLES 13 AND 14

Base resin

The equipment used to form the base resin above is employed to form another base resin in the same manner. The mixed reactants are added to the tube in the indicated quantities, the tube is sealed with the cork, the nitrogen turned on and the reaction proceeds at 180±4° C.

| Condensation monomer | Molecular weight | Moles | Grams | Milli-equivalents |
|---|---|---|---|---|
| Pentachlorophenoxy acetic acid | 324.35 | 0.080 | 25.948 | 80 |
| Maleic anhydride | 98.06 | 0.080 | 7.845 | 160 |
| Pentaerythritol | 136.15 | 0.032 | 4.357 | 128 |
| 1,6 hexanediol | 118.18 | 0.056 | 6.618 | 112 |

After a reaction time of 3 hours the acid number has dropped to 23.9 milligrams of KOH per gram of resin. The heat is turned off and 12.6 milligrams of hydroquinone is added as a polymerization inhibitor. The resin is then cooled to room temperature. The chlorine content of the resin is 33.9% based on the total weight of the resin. The weight of the hydroquinone is insignificant since it only amounts to a small fraction of the resin. The resulting base resin is hard, solid and clear and is flame retardant according to ASTM–D–635–63.

Cured resin

The base resin is then mixed at 90° C. under nitrogen with 30% by weight of the styrene and allowed to cool at room temperature. The resulting viscous resin solution is stable at room temperature. The resin is then mixed at room temperature with 1.0% by weight of benzoyl peroxide. The samples are cured at 115° C. for a period of about 17 hours in glass tubes to form rods 6 millimeters in diameter and 6" in length. A water white, hard, brittle resin results. The resin has a chlorine content of 23.7% based on the total weight of the resin. When the resin is subjected to ASTM–D–635–63, the test shows it to be flame retardant.

The above examples show that long chain aliphatic diols may be used to form the polyesters encompassed by the present invention.

EXAMPLES 15 AND 16

Base resin

The equipment used to form the base resin is employed to form another base resin in the same manner. The mixed reactants are added to the tube in the indicated quantities, the tube is sealed with the cork, the nitrogen turned on and the reaction proceeds at 160–166° C.

| Condensation monomer | Molecular weight | Moles | Grams | Milli-equivalents |
|---|---|---|---|---|
| Pentachlorophenoxy acetic acid | 324.35 | 0.070 | 22.705 | 70 |
| Maleic anhydride | 98.06 | 0.080 | 7.845 | 160 |
| 1,2, propylene glycol | 76.09 | 0.054 | 4.109 | 108 |
| Trimethyolethane | 120.15 | 0.054 | 6.433 | 162 |

After a reaction time of 4¼ hours the acid number has dropped to 22.1 milligrams of KOH per gram of resin. The heat is turned off and 11.5 milligrams of hydroquinone is added as a polymerization inhibitor. The resin is then cooled to room temperature. The chlorine content of the resin is 32.3% based on the total weight of the resin. The weight of the hydroquinone is insignificant since it only amounts to a small fraction of the resin. The resulting base resin is hard, slightly yellow and brittle and is flame retardant according to ASTM–D–635–63.

Cured resin

The base resin is then mixed at 90° C. under nitrogen with 30% by weight of the styrene and allowed to cool at room temperature. The resulting viscous base solution is stable at room temperature. The resin is then mixed at room temperature with 1.0% by weight of benzoyl peroxide. The samples are cured at 110° C. for a period of about 17 hours in glass tubes to form rods 6 millimeters in diameter and 6″ in length. A clear, slightly yellow, brittle resin results. The resin has a chlorine content of 22.6% based on the total weight of the resin. When the resin is subjected to ASTM–D–635–63, the test shows it to be flame retardant.

The above examples show that the milliequivalents of carboxyl and hydroxyl group need not be stoichiometrically balanced.

EXAMPLES 17 AND 18

Base resin

The equipment used to form the base resin above is employed to form another base resin in the same manner. The mixed reactants are added to the tube in the indicated quantities, the tube is sealed with the cork, the nitrogen turned on and the reaction proceeds at 168–175° C.

| Condensation monomer | Molecular weight | Moles | Grams | Milli-equivalents |
|---|---|---|---|---|
| Pentachlorophenoxy acetic acid | 324.35 | 0.060 | 19.461 | 60 |
| Maleic anhydride | 98.06 | 0.078 | 7.599 | 155 |
| 1,2 propylene glycol | 76.09 | 0.025 | 19.02 | 50 |
| Trimethyolpropane | 134.17 | .055 | 7.379 | 165 |

After a reaction time of 4½ hours the acid number has dropped to 18.6 milligrams of KOH per gram of resin. The heat is turned off and 10.2 milligrams of hydroquinone is added as a polymerization inhibitor. The resin is then cooled to room temperature. The chlorine content of the resin is 31.4% based on the total weight of the resin. The weight of the hydroquinone is insignificant since it only amounts to a small fraction of the resin. The resulting base resin is hard, slightly yellow and clear and is flame retardant according to ASTM–D–635–63.

Cured resin

The base resin is then mixed at 90° C. under nitrogen with 30% by weight of the styrene and allowed to cool at room temperature. The resulting viscous resin solution is stable at room temperature. The resin is then mixed at room temperature with 1.0% by weight of benzoyl peroxide. The samples are cured at 110° C. for a period of about 17 hours in glass tubes to form rods 6 millimeters in diameter and 6″ in length. A clear, hard, resin results. The resin has a chlorine content of 22.0% based on the total weight of the resin. When the resin is subjected to ASTM–D–635–63, the test shows it to be flame retardant.

The above examples show that the pentachlorophenoxy acetic acid can be used with a variety of polyester resins to make them flame retardant.

EXAMPLES 19 AND 20

Base resin

The equipment used to form the base resin above is employed to form another base resin in the same manner. The mixed reactants are added to the tube in the indicated quantities, the tube is sealed with the cork, the nitrogen turned on and the reaction proceeds at 160±2° C.

| Condensation monomer | Molecular weight | Moles | Grams | Milli-equivalents |
|---|---|---|---|---|
| Pentachlorophenoxy acetic acid | 324.35 | .050 | 16.218 | 50 |
| Maleic anhydride | 98.06 | .055 | 5.394 | 110 |
| Adipic acid | 146.14 | 0.015 | 2.192 | 30 |
| 1,2 propylene glycol | 134.18 | 0.05 | 3.805 | 10 |
| Pentaerythritol | 136.15 | .023 | 3.064 | 9 |

After a reaction time of 5¼ hours the acid number has dropped to 31.8 milligrams of KOH per gram of resin. The heat is turned off and 8.5 milligrams of hydroquinone is added as a polymerization inhibitor. The resin is then cooled to room temperature. The chlorine content of the resin is 31.4% based on the total weight of the resin. The weight of the hydroquinone is insignificant since it only amounts to a small fraction of the resin. The resulting base resin is hard, yellowish and clear and is flame retardant according to ASTM–D–635–63.

Cured resin

The base resin is then mixed at 90° C. under nitrogen with 29.8% by weight of the styrene and allowed to cool at room temperature. The resulting viscous resin solution is stable at room temperature. The resin is then mixed at room temperature with 1.0% by weight of benzoyl peroxide. The samples are cured at 110° C. for a period of about 17 hours in glass tubes to form rods 6 millimeters in diameter and 6″ in length. A slightly yellow, tough, clear resin results. The resin has a chlorine content of 22.0% based on the total weight of the resin. When the resin is subjected to ASTM–D–635–63, the test shows it to be flame retardant.

The above examples show that the pentachlorophenoxy acetic acid can be used with a variety of polyester resins to make them flame retardant.

EXAMPLE 21

The equipment used to form the base resin above is employed to form another base resin in the same manner. The mixed reactants are added to the tube in the indicated quantities, the tube is sealed with the cork, the nitrogen turned on and the reaction proceeds at 160° C.

| Condensation monomer | Molecular weight | Moles | Grams | Milli-equivalents |
|---|---|---|---|---|
| Pentachlorophenoxy acetic acid | 324.35 | 0.150 | 48.7 | 150 |
| Maleic anhydride | 98.06 | 0.050 | 4.90 | 100 |
| Glycerol | 92.09 | 0.048 | 4.50 | 145 |
| Diethylene glycol | 106.12 | 0.053 | 5.61 | 106 |

After a reaction time of 4 hours the acid number has dropped to 8.9 milligrams of KOH per gram of resin. The heat is turned off and 38 milligrams of hydroquinone is added as a polymerization inhibitor. The resin is then cooled at room temperature. The chlorine content of the resin is 41.0% based on the total weight of the resin. The weight of the hydroquinone is insignificant since it only amounts to a small fraction of the resin. The resulting base resin is dark yellow, very hard and opaque and is flame retardant according to ASTM–D–635–63.

EXAMPLES 22 AND 23

Base resin

A 4 neck round bottom one liter reactor flask is heated with a "Glas-Col" electric heating mantle. It is equipped with a mechanical stirrer in the center neck with the stirrer being equipped with a "Tru-bore" glass bearing which is water cooled and vacuum tight. The bearing shaft is connected to an electric stirring motor. In one of the other openings, a glass bubbler is inserted which delivers nitrogen as a sparge gas via a glass tube to the bottom of the reactor. In another neck a steam jacketed "Vigreaux" distillation column is inserted. On the top of the "Vigreaux" column a distillation take off with a water cooled condenser is attached. At the top of the "Vigreaux" column a thermometer (0 to 130° C. scale) is inserted for measuring the temperature. This system allows the water vapor to pass out of the reaction chamber but still retains any glycol in the reaction flask. In the fourth neck of the reactor flask a thermometer is inserted to measure pot temperature. A graduated beaker is placed at the exit of the take off condenser to measure water of esterification. The listed reactants are added to the reactor flask in the indicated quantities. The reactants are heated to a temperature of 180° C.±3° C.

| Condensation monomer | Molecular weight | Moles | Grams | Milli-equivalents |
|---|---|---|---|---|
| Pentachlorophenoxy acetic acid | 324.35 | 0.80 | 859.5 | 800 |
| Maleic anhydride | 98.06 | 1.10 | 107.9 | 2,200 |
| 1,2 propylene glycol | 76.09 | 0.82 | 62.4 | 1,640 |
| Pentaerythritol | 136.15 | 0.34 | 46.3 | 1,360 |

After a reaction time of 7¼ hours the acid number is 38.0 milligrams of KOH per gram of resin. The heat is turned off and the heating mantle is taken away from the flask. After cooling to 120° C., 95.2 milligrams of hydroquinone is added as a polymerization inhibitor and the resin is cooled to room temperature. The chlorine content of the resulting resin is 32.1% based on the total weight of the resin. The weight of the hydroquinone is insignificant since it represents only a small fraction of a percent.

Cured resin

The base resin is heated to about 75° C. and 189.4 grams of styrene are added and mixed with the base resin. The mixture is cooled to room temperature at which temperature the mixture is stable. To cure the resin, 1% by weight of benzoyl peroxide is mixed with the resin. Samples of the resin are then cured by placing the liquid resin in glass tubes 6 millimeters in diameter and curing the resin at 110° C. for a period of about 17 hours. The polymer shrinks upon curing and is easily removed from the tubes. A hard tough polymer results which is water white in color. When the polymer is subjected to ASTM–D–635–63 test it proves to be flame retardant.

While in the above examples unmodified polyester resins are produced, it is obvious that other materials such as dyes, pigments, fibers, other comonomers and other polymers may be introduced into the resin without substantial alteration of the flame resistance properties of the resin. The polyester resin of the present invention can be brushed or sprayed onto a surface of wood, metal, glass or the like. They may also be used for impregnating fiberglass sheets. In addition, the resin may be formed into clear or translucent panels for use in the building trade. Other uses for such flame retardant polyester resins would be obvious to those skilled in the art.

Many equivalent modifications will be apparent to those skilled in the art from a reading of the foregoing without a departure from the inventive concept.

What is claimed is:

1. In a modified unsaturated dicarboxylic acid polyester resin consisting essentially of the reaction product of maleic acid, its anhydride, or halide, and a polyhydroxy alcohol, the improvement which consists of the presence in the polyester resin of pendant pentachlorophenoxy acetate radicals having the formula:

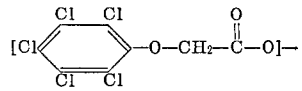

wherein at least about 10% by weight of the said resin is chlorine chemically bonded to said radicals.

2. The modified unsaturated dicarboxylic acid polyester resin of claim 1 wherein the chlorine chemically bonded to said radicals is in an amount from about 10 to about 46% by weight of the said resin.

3. The modified unsaturated dicarboxylic acid polyester resin of claim 1 wherein the chlorine chemically bonded to said radicals is in an amount from about 18 to about 40% by weight of the said resin.

4. The modified unsaturated dicarboxylic acid polyester resin of claim 1 wherein the said chlorine chemically bonded to said radicals is in an amount from about 21 to about 38% by weight of the said resin.

5. In a modified unsaturated dicarboxylic acid polyester resin consisting essentially of the reaction product of maleic acid, its anhydride, or halide, and a polyhydroxy alcohol crosslinked with styrene, the improvement which consists of the presence in the polyester resin of pendant pentachlorophenoxy acetate radicals having the formula:

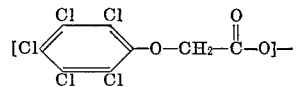

wherein from about 18 to about 40% by weight of the said resin is chlorine chemically bonded to said radicals.

References Cited

UNITED STATES PATENTS

| 3,043,881 | 7/1962 | Wismer | 260—613 |
| 3,060,146 | 10/1962 | Wismer | 260—45.4 |
| 3,343,941 | 9/1967 | Baltzzi | 71—71 |
| 3,400,174 | 9/1968 | Heidel et al. | 260—869 |

WILLIAM SHORT, Primary Examiner

M. GOLDSTEIN, Assistant Examiner

U.S. Cl. X.R.

117—124, 132, 148; 260—75